(12) United States Patent
R et al.

(10) Patent No.: US 11,809,266 B2
(45) Date of Patent: *Nov. 7, 2023

(54) FAILURE IMPACT ANALYSIS OF NETWORK EVENTS

(71) Applicant: Juniper Networks, Inc., Sunnyvale, CA (US)

(72) Inventors: Jayanthi R, Coimbatore (IN); Javier Antich, Valencia (ES); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,096

(22) Filed: Feb. 22, 2022

(65) Prior Publication Data
US 2022/0179726 A1 Jun. 9, 2022

Related U.S. Application Data

(63) Continuation of application No. 16/946,994, filed on Jul. 14, 2020, now Pat. No. 11,269,711.

(51) Int. Cl.
*G06F 11/07* (2006.01)
*H04L 41/14* (2022.01)
*H04L 41/22* (2022.01)

(52) U.S. Cl.
CPC ........ *G06F 11/079* (2013.01); *G06F 11/0709* (2013.01); *G06F 11/0751* (2013.01); *H04L 41/145* (2013.01); *H04L 41/22* (2013.01)

(58) Field of Classification Search
CPC . G06F 11/079; G06F 11/0709; G06F 11/0751
See application file for complete search history.

(56) References Cited

U.S. PATENT DOCUMENTS

| | | |
|---|---|---|
| 5,130,936 A | 7/1992 | Sheppard et al. |
| 5,381,417 A | 1/1995 | Loopik et al. |

(Continued)

FOREIGN PATENT DOCUMENTS

| | | |
|---|---|---|
| CN | 1529455 A | 9/2004 |
| CN | 102473129 A | 5/2012 |

(Continued)

OTHER PUBLICATIONS

Response to Extended Search Report dated Mar. 15, 2021, from counterpart European Application No. 20200311.7 filed Jul. 18, 2022, 28 pp.

(Continued)

*Primary Examiner* — Jigar P Patel
(74) *Attorney, Agent, or Firm* — Shumaker & Sieffert, P.A.

(57) ABSTRACT

Failure impact analysis (or "impact analysis") is a process that involves identifying effects of a network event that are may or will results from the network event. In one example, this disclosure describes a method that includes generating, by a control system managing a resource group, a resource graph that models resource and event dependencies between a plurality of resources within the resource group; detecting, by the control system, a first event affecting a first resource of the plurality of resources, wherein the first event is a network event; and identifying, by the control system and based on the dependencies modeled by the resource graph, a second resource that is expected to be affected by the first event.

18 Claims, 9 Drawing Sheets

(56) References Cited

U.S. PATENT DOCUMENTS

| | | | |
|---|---|---|---|
| 6,336,138 B1 | 1/2002 | Caswell et al. | |
| 7,552,447 B2 | 6/2009 | Uthe | |
| 7,865,888 B1 | 1/2011 | Qureshi et al. | |
| 7,945,817 B1 | 5/2011 | Usery et al. | |
| 8,264,702 B2 | 9/2012 | St. Jacques, Jr. et al. | |
| 8,954,972 B2* | 2/2015 | Lam | G06F 9/4881 718/102 |
| 9,104,572 B1 | 8/2015 | Thompson | |
| 9,189,319 B2 | 11/2015 | Ito et al. | |
| 9,692,671 B2 | 6/2017 | Groenendijk et al. | |
| 10,187,260 B1 | 1/2019 | Chen et al. | |
| 10,200,248 B1 | 2/2019 | Jiang et al. | |
| 10,516,761 B1 | 12/2019 | A et al. | |
| 10,601,640 B1 | 3/2020 | Das et al. | |
| 10,970,143 B1* | 4/2021 | Wade | G06F 9/4881 |
| 11,269,718 B1 | 3/2022 | Chen | |
| 11,405,260 B2 | 8/2022 | A et al. | |
| 2002/0022952 A1 | 2/2002 | Zager et al. | |
| 2004/0049372 A1 | 3/2004 | Keller | |
| 2004/0049565 A1 | 3/2004 | Keller et al. | |
| 2004/0268335 A1* | 12/2004 | Martin | G06F 8/4452 717/161 |
| 2005/0015217 A1 | 1/2005 | Weidl et al. | |
| 2005/0137762 A1 | 6/2005 | Rother | |
| 2005/0181835 A1 | 8/2005 | Lau | |
| 2005/0262106 A1* | 11/2005 | Enqvist | H04L 67/565 |
| 2005/0289395 A1 | 12/2005 | Katsuyama et al. | |
| 2006/0069805 A1 | 3/2006 | LeBlanc | |
| 2006/0248389 A1 | 11/2006 | Thaler et al. | |
| 2007/0233438 A1 | 10/2007 | Quimper et al. | |
| 2008/0016115 A1 | 1/2008 | Bahl et al. | |
| 2008/0021918 A1* | 1/2008 | Rao | G06F 16/958 707/999.102 |
| 2008/0222287 A1 | 9/2008 | Bahl et al. | |
| 2010/0115341 A1 | 5/2010 | Baker et al. | |
| 2010/0138694 A1 | 6/2010 | Harrison et al. | |
| 2011/0154367 A1 | 6/2011 | Gutjahr et al. | |
| 2011/0231704 A1 | 9/2011 | Ge et al. | |
| 2011/0320874 A1 | 12/2011 | Shimada et al. | |
| 2012/0005532 A1 | 1/2012 | Li et al. | |
| 2012/0222745 A1 | 9/2012 | Kolarsky | |
| 2013/0097183 A1 | 4/2013 | McCracken | |
| 2013/0339515 A1* | 12/2013 | Radhakrishnan | H04L 41/147 709/224 |
| 2014/0222745 A1 | 8/2014 | Deng et al. | |
| 2015/0003595 A1 | 1/2015 | Yaghi et al. | |
| 2015/0199226 A1 | 7/2015 | Wu et al. | |
| 2015/0280969 A1 | 10/2015 | Gates | |
| 2015/0319090 A1 | 11/2015 | Fu et al. | |
| 2017/0075744 A1 | 3/2017 | Deshpande et al. | |
| 2017/0075749 A1 | 3/2017 | Ambichl et al. | |
| 2017/0102997 A1* | 4/2017 | Purushothaman | G06F 11/079 |
| 2017/0279687 A1 | 9/2017 | Muntes-Mulero et al. | |
| 2017/0288940 A1* | 10/2017 | Lagos | H04L 41/0266 |
| 2017/0359232 A1 | 12/2017 | Stoops et al. | |
| 2017/0366983 A1 | 12/2017 | Gunasekara et al. | |
| 2017/0372212 A1 | 12/2017 | Zasadzinski et al. | |
| 2017/0372323 A1 | 12/2017 | Stern et al. | |
| 2018/0054351 A1* | 2/2018 | Bhandari | H04L 41/0604 |
| 2018/0069771 A1 | 3/2018 | Dade et al. | |
| 2018/0136987 A1* | 5/2018 | He | G06F 9/542 |
| 2018/0218264 A1 | 8/2018 | Renders et al. | |
| 2019/0081850 A1 | 3/2019 | Nazar et al. | |
| 2019/0165988 A1 | 5/2019 | Wang et al. | |
| 2019/0230003 A1 | 7/2019 | Gao et al. | |
| 2019/0356403 A1 | 11/2019 | V.K et al. | |
| 2020/0042426 A1 | 2/2020 | Ambichl | |
| 2020/0064797 A1 | 2/2020 | Hannon et al. | |
| 2020/0250559 A1 | 8/2020 | Dinh et al. | |
| 2020/0409781 A1 | 12/2020 | Zhen et al. | |
| 2021/0014103 A1 | 1/2021 | Zhang et al. | |
| 2021/0026723 A1 | 1/2021 | Nadger et al. | |
| 2021/0037081 A1 | 2/2021 | Slavik | |
| 2021/0152416 A1 | 5/2021 | A et al. | |
| 2021/0243068 A1 | 8/2021 | R et al. | |
| 2021/0271522 A1 | 9/2021 | Butterworth et al. | |
| 2022/0019494 A1 | 1/2022 | R et al. | |
| 2022/0179726 A1 | 6/2022 | R et al. | |
| 2022/0286348 A1 | 8/2022 | Han | |

FOREIGN PATENT DOCUMENTS

| | | |
|---|---|---|
| CN | 104584483 A | 4/2015 |
| EP | 1405187 A1 | 4/2004 |
| EP | 2961100 A1 | 12/2015 |
| WO | 2013/055760 A1 | 4/2013 |

OTHER PUBLICATIONS

Bahl et al., "Towards Highly Reliable Enterprise Network Services Via Inference of Multi-level Dependencies," ACM SIGCOMM Computer Communication Review, Aug. 27-31, 2007, pp. 13-24.

Bjorklund, "YANG—A Data Modeling Language for the Network Configuration Protocol (NETCONF)," Internet Engineering Task Force (IETF), RFC 6020, Oct. 2010, 173 pp.

Clemm et al., "A YANG Data Model for Network Topologies" Internet Engineering Task Force (IETF) RFC 8345, Mar. 2018, 57 pp.

Dusia et al., "Recent Advances in Fault Localization in Computer Networks," IEEE Communications Surveys & Tutorials, May 18, 2016, pp. 3030-3051.

Enns, "NETCONF Configuration Protocol," Network Working Group, RFC 4741, Dec. 2006, 95 pp.

Extended Search Report from counterpart European Application No. 20200311.7, dated Mar. 15, 2021, 8 pp.

Gruschke, "Integrated event management: Event correlation using dependency graphs," In Proceedings of the 9th IFIP/IEEE International Workshop on Distributed Systems: Operations & Management (DSOM 98). Oct. 1998, 12 pp.

Harrington et al., "An Architecture for Describing Simple Network Management Protocol (SNMP) Management Frameworks," Network Working Group, RFC 3411, Dec. 2002, 64 pp.

Huang et al., "Performance Diagnosis for SOA on Hybrid Cloud Using the Markov Network Model," 2013 IEEE 6th International Conference on Service-Oriented Computing and Applications, Koloa, Hawaii, Dec. 16-18, 2013, pp. 17-24.

Prosecution History from U.S. Appl. No. 16/946,994, dated Apr. 27, 2021 through Feb. 3, 2022, 43 pp.

Sanchez et al., "Self-Modeling based Diagnosis of Services over Programmable Networks," 2016 IEEE NetSoft Conference and Workshops (NetSoft), Seoul, Korea (South), Jun. 2016, 10 pp.

Schoenwaelder, "Common YANG Data Types" Internet Engineering Task Force (IETF), RFC 6991, Jul. 2013, 30 pp.

Steinder et al., "A survey of fault localization techniques in computer networks," Science Direct, Science of Computer Programming, vol. 53, Issue 2, Nov. 2004, pp. 165-194.

U.S. Appl. No. 17/032,799, filed Sep. 25, 2020, naming inventors Grammel et al.

Yan et al., "G-RCA: A Generic Root Cause Analysis Platform for Service Quality Management in Large IP Networks" IEEE/ACM Transactions on Networking; vol. 20, Issue: 6, Dec. 2012, pp. 1734-1747.

Katker et al., "Fault isolation and event correlation for integrated fault management", International Symposium on Integrated Network Management, Springer, Boston, MA, 1997, 583-596 pp., (Applicant points out, in accordance with MPEP 609.04(a), that the year of publication, 1997, is sufficiently earlier than the effective U.S. filing date, so that the particular month of publication is not in issue.).

Chen et al. "Causeinfer: Automatic and distributed performance diagnosis with hierarchical causality graph in large distributed systems." IEEE INFOCOM 2014—IEEE Conference on Computer Communications. IEEE, 2014, Apr. 27-May 2, 2014, pp. 1887-1895.

(56) References Cited

OTHER PUBLICATIONS

Qiu et al. "A causality mining and knowledge graph based method of root cause diagnosis for performance anomaly in cloud applications." Applied Sciences 10.6 (2020): 2166., Mar. 2020, 19 pp.

* cited by examiner

FAILURE IMPACT ANALYSIS OF NETWORK EVENTS

CROSS REFERENCE

This application is a continuation application of and claims priority to U.S. patent application Ser. No. 16/946,994 filed on Jul. 14, 2020, which is hereby incorporated by reference herein in its entirety.

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

The explosion in the number of Internet of Things (IoT) and the need for large data centers to host cloud and web applications create a need for mechanisms to effectively analyze, evaluate, and/or control complex, heterogeneous and distributed networks. Network systems tend to need distributed and fast diagnosis solution techniques to analyze dependent events. In complex networks, a breakdown in the underlying layer of the network may cause a large number of higher layer services to fail, which may or may not be directly connected to the failing component.

SUMMARY

This disclosure describes techniques for determining an impact that a network event involving one resource in a network may have on other resources in the network. In some examples, such techniques may involve deriving impact analysis rules based on model dependencies (e.g., both resource and event dependencies). In some examples, an expert system that uses forward chaining principles may use the derived impact analysis rules to determine predicted or expected impacts resulting from a network event. Identifying such impacts may involve generating logical events based on the rules, where such logical events may be caused by network events or other logical events. In some cases, logical and network events may be merged with corresponding logical or network events to facilitate efficient and/or intelligent processing of events.

In some examples, this disclosure describes operations performed by a control system in accordance with one or more aspects of this disclosure. In one specific example, this disclosure describes a method comprising detecting, by a control system, a first network event affecting a first resource of a plurality of resources on a network; generating, by the control system and based on dependencies among the plurality of resources, a logical event associated with a second resource, wherein the second resource is expected to be affected by the first network event; detecting, by the control system and after generating the logical event associated with the second resource, a second network event affecting the second resource; and refraining, by the control system, from processing the second network event.

In another example, this disclosure describes a system comprising processing circuitry and a storage device, wherein the processing circuitry has access to the storage device and is configured to: detect a first network event affecting a first resource of a plurality of resources on a network; generate, based on dependencies among the plurality of resources, a logical event associated with a second resource, wherein the second resource is expected to be affected by the first network event; detect, after generating the logical event associated with the second resource, a second network event affecting the second resource; and refrain from processing the second network event.

In another example, this disclosure describes a computer-readable storage medium comprising instructions that, when executed, configure processing circuitry of a computing system to preform operations as described herein.

DETAILED DESCRIPTION

Figure 1:
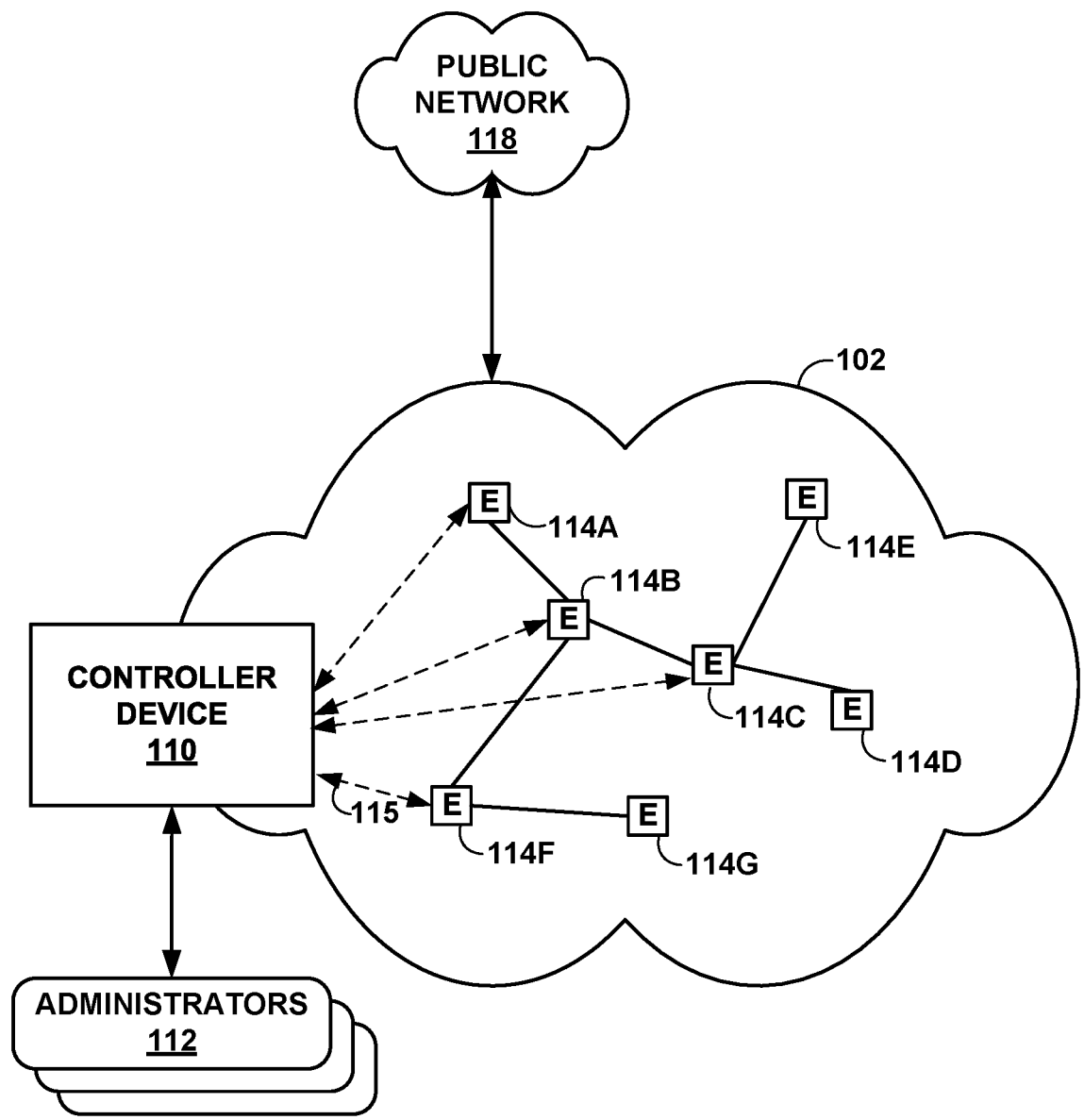
FIG. 1 is a block diagram illustrating an example network configured to perform failure impact analysis in accordance with one or more aspects of the present disclosure.

Failure impact analysis (or "impact analysis") is a process that involves identifying effects of a network event that may or will result from the network event. Failure impact analysis may enable early detection of a failure or other network event, and may also enable remedial actions to be taken sufficiently early so that effects of the network event may be mitigated or avoided. Fault diagnosis (sometimes referred to as "root cause analysis" or "RCA") is closely related to failure impact analysis. RCA is a process to identify the initiating condition or event that triggers a network component failure from a set of possible candidate events/conditions that are generated or present within a discrete time window. RCA can be a critical task for operators to maintain a properly functioning network. A few possible techniques that may be used to perform both impact analysis and RCA include a model traversing technique and a dependency graph technique.

The model traversing technique uses object models to determine fault propagation. The network is represented using various components and relationships between the components. Based on this model representing the network, fault dependencies can be inferred and used to identify the root cause of an issue. Model traversing techniques do not specify fault dependencies directly, but instead, derive the fault dependencies from the model during run-time. These techniques are suitable for a network that changes frequently. However, by themselves, model traversing techniques cannot deal with more complex fault propagation scenarios (e.g., model traversing techniques typically base fault propagation on an assumption that only one issue happens at a time, etc.).

The dependency graph technique uses a directed graph to model dependencies between the object events. Nodes represent network elements (e.g., network devices and/or hosts). An edge from node A:event to node B:event indicates that the failures in node A can cause failures in node B. Dependency graphs are often used in networks with infrequent changes. In networks with frequent changes, the dependencies need to be updated frequently. Network complexity is on the increase, particularly in light of the rapid increase in the number of connected devices, the relatively complex topology of distributed networks, and increasing internet of things (IoT) adoption. These factors also contribute to the heterogeneity of networks, due to the differences in device capabilities and configurations. For example, one network can be overlaid on top of another network. For example, virtual private networks (VPNs) are overlaid on internet protocol (IP) networks that use it as a transport layer. Network troubleshooters need a mechanism by which to correlate the issues across layers with a generic model-driven solution that can be applied to any network and service topology, that can support networks with frequent changes, and that can support multiple concurrent faults at a time.

Because networks are dynamic with respect to their structures and components, adaptability of the correlation system to ongoing changes in the network topology, component types and versions, and the services offered may represent a technical improvement over existing impact analysis or RCA technologies. Programmable diagnosis services, as described herein, may provide scalability and response times that enable reliable impact analysis and RCA over dynamic, heterogenous networks. Such a programmable diagnosis model may enable network administrators to program the network and device resources including service resources, device resources, and resource dependencies therebetween. Additionally, a programmable diagnosis model may enable network administrators to program cause-and-effect relationships between resource events that may occur within the network. Such a model may also enable administrators to initialize telemetry rules, either with device resource properties in the case of device resources, or via service association inheritance in the case of service-associated device resources. Based on a model programmed in this way, a controller operating within a network may automatically derive inference rules with respect to resource event interrelationships. The controller may occasionally, periodically, or continually update the inference rules, and implement the inference rules to perform impact analysis or RCA-based forward chaining of network resource events. A programmable diagnosis model may also enable incorporation, into the model, of temporal relationships between resource events to perform impact analysis or RCA among potentially interrelated events. The inference rules can be augmented with temporal constraints to enable temporal-based impact analysis or RCA.

Techniques described herein may use element models, service models, and multi-layer models. The element model accounts for network devices that uses various resources (e.g., a packet forwarding engine (PFE), a line card, interfaces, chassis, CPUs, etc.), captures the relationships between these resources, and captures dependencies between various network resource events. The service model accounts for services spread across the devices (e.g., layer-3 (L3) VPN/virtual private LAN services (VPLS), label-switched path (LSP) tunnels, etc.). The service model comprises various events captured at the service level. The service model captures (i) service and service endpoint associations, (ii) connectivity link (path) between various endpoint (e.g., a VPN service with endpoints Node A, B, C contains a tunnel between Node A and Node B and a tunnel between Node A and Node C, etc.), (iii) dependencies across service events, (iv) dependencies across the endpoint events, and (v) dependency between device event to service event. Networks are typically layered, and as such, a broken link in an underlying layer or any other problem in the lower layer services cause many higher layer services to fail, even when these services are not directly connected to the failing components. The multi-layer model can capture (i) service to service dependencies, (ii) service link to service link dependencies, and (iii) dependencies across service events.

Aspects of underlying element and service models are described in U.S. patent application Ser. No. 16/731,372, filed Dec. 31, 2019 entitled "Network Model Aware Diagnosis Of A Network," the entire content of which is incorporated herein. Techniques described herein may also use a programmable diagnosis service, such as that described in U.S. patent application Ser. No. 16/821,745, filed Mar. 17, 2020 entitled "Programmable Diagnosis Model For Correlation Of Network Events," the entire content of which is incorporated herein by reference Modern data centers and/or networks are often evaluated, compared, and distinguished by reliability and service levels. In some cases, for data centers that provide networking and compute services for hire, data center customers tend to expect service level agreements ("SLAs") that obligate or guarantee data center performance for end-to-end services. Accordingly, dealing with failures or other events that may affect network performance and service SLAs can be important. Metrics such as Mean Time between Failures (MTBF) and Mean Time to Repair (MTTR) are sometimes used as the basis for SLAs. For data center providers bound by such SLAs, reacting quickly and accurately when detecting a failure of a network resource is particularly important.

Networks tend to be dynamic with respect to their structures and components. An impact analysis or RCA system that can adapt to changes in network topology, component types and versions, services offered, and other aspects of a network is advantageous. One way to enable such adaptability is for a diagnosis service to be programmable. In some cases, such a programmable diagnosis service may enable an administrator to define resources, resource dependencies, and/or cause and effect relationships across those resources. When such attributes of a network are defined, it may be possible for an inference engine or other system to derive inference rules that can be used for performing impact analysis and/or RCA.

A failure impact analysis system, in various examples described herein, may derive failure impact analysis rules based on model dependencies, where such dependencies could include both resource and event dependencies. In some examples, a forward chaining-based expert system approach may be based on such failure impact analysis rules. In some examples, such failure impact analysis rules may be derived based on resource dependences as described herein. Along with inferred impact events (e.g., "logical events"), one or more corresponding actual or "real" events ("network events") also may be generated. A failure impact analysis system should deal with such a situation effectively, such as by updating the actual event and/or correctly representing the actual network event.

FIG. 1 is a block diagram illustrating an example network configured to perform failure impact analysis in accordance with one or more aspects of the present disclosure. Network 102 includes network devices, components, or elements that may be managed using a control system or controller device, such as controller 110. In some examples, network 102 may be an enterprise network operated or managed by an enterprise or other organization. Managed elements 114A-114G (collectively, "elements 114") of network 102 include network devices interconnected via communication links to form a communication topology enabling the exchange of resources and information. Elements 114 may be organized into one or more resource groups, and may include, for example, routers, switches, gateways, bridges, hubs, servers, firewalls or other intrusion detection systems (IDS) or intrusion prevention systems, computing devices, computing terminals, printers, other network devices, or a combination of such devices. While described in this disclosure as transmitting, conveying, or otherwise supporting packets, network 102 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 114 may be physical links (e.g., optical, copper, and the like), wireless, or any combination thereof.

Network 102 is shown coupled to a public network 118 (e.g., the internet) via a communication link. Public network 118 may include, for example, one or more client computing devices. Public network 118 may provide access to web servers, application servers, public databases, media servers, end-user devices, and other types of network resource devices and content.

Controller 110 may be communicatively coupled to elements 114 within one or more resource groups via network 102. Controller 110, in some examples, forms part of a device management system, although only one device of the device management system is shown for ease of illustration in FIG. 1. Controller 110 may be coupled either directly or indirectly to the various elements 114. Once elements 114 are deployed and activated, administrators 112 may use controller 110 (or multiple such management devices) to manage network devices using a device management protocol. One example device protocol is the Simple Network Management Protocol (SNMP) that allows controller 110 to traverse and modify management information bases (MIBs) that store configuration data within each of the managed elements 114. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at tools.ietf.org/html/rfc3411, the entire contents of which are incorporated herein by reference.

In common practice, controller 110, also referred to as a network management system (NMS) or NMS device, and elements 114 are maintained by an information technology (IT) group of the enterprise. Administrators 112 may interact with controller 110 to remotely monitor and configure elements 114. For example, administrators 112 may receive alerts from controller 110 regarding any of elements 114, view configuration data of elements 114, modify the configurations data of elements 114, add new network devices to network 102, remove existing network devices from network 102, or otherwise manipulate network 102 and network devices therein. Although described herein with respect to an enterprise network, the techniques of this disclosure are also applicable to other network types, public and private, including LANs, VLANs, VPNs, and the like.

In some examples, administrators 112 use controller 110 or a local workstation to interact directly with elements 114, e.g., through telnet, secure shell (SSH), or other such communication sessions. That is, elements 114 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 115 with one of elements 114, e.g., element 14F, using controller 110, to directly configure element 14F. In this manner, a user can provide commands in a format for execution directly to elements 114.

Further, administrators 112 can also create scripts that can be submitted by controller 110 to any or all of elements 114. For example, in addition to a CLI interface, elements 114 may also provide interfaces for receiving scripts that specify the commands in accordance with a scripting language. In a sense, the scripts may be output by controller 110 to automatically invoke corresponding remote procedure calls (RPCs) on the managed elements 114. The scripts may conform to, e.g., extensible markup language (XML) or another data description language.

Administrators 112 use controller 110 to configure elements 114 to specify certain operational characteristics that further the objectives of administrators 112. For example, administrators 112 may specify for an element 114 a particular operational policy regarding security, device accessibility, traffic engineering, quality of service (QoS), network address translation (NAT), packet filtering, packet forwarding, rate limiting, or other policies. Controller 110 uses one or more network management protocols designed for management of configuration data within the managed network elements 114, such as the SNMP protocol or the Network Configuration Protocol (NETCONF) protocol, or a derivative thereof, such as the Juniper Device Management Interface, to perform the configuration. Controller 110 may establish NETCONF sessions with one or more of elements 114.

Controller 110 may be configured to compare a new intent data model to an existing (or old) intent data model, determine differences between the new and existing intent data models, and apply the reactive mappers to the differences between the new and old intent data models. In particular, controller 110 determines whether the new data model includes any additional configuration parameters relative to the old intent data model, as well as whether the new data model modifies or omits any configuration parameters that were included in the old intent data model.

The intent data model may be a unified graph model, while the low-level configuration data may be expressed in YANG, which is described in (i) Bjorklund, "YANG—A Data Modeling Language for the Network Configuration Protocol (NETCONF)," Internet Engineering Task Force, RFC 6020, October 2010, available at tools.ietf.org/html/rfc6020, and (ii) Clemm et al., "A YANG Data Model for Network Topologies," Internet Engineering Task Force, RFC 8345, March 2018, available at tools.ietf.org/html/rfc8345 (sometimes referred to as "RFC 8345"). In some examples, the intent data model may be expressed in YAML Ain't Markup Language (YAML). Controller 110 may include various reactive mappers for translating the intent data model differences. These functions are configured to accept the intent data model (which may be expressed as structured input parameters, e.g., according to YANG or YAML). The functions are also configured to output respective sets of low-level device configuration data model changes, e.g., device configuration additions and removals. That is, y1=FIG. 1($x$), y2=FIG. 2($x$), . . . yN=fN(x).

Controller 110 may use YANG modeling for intent data model and low-level device configuration models. This data may contain relations across YANG entities, such as list items and containers. As discussed in greater detail herein, controller 110 may convert a YANG data model into a graph data model, and convert YANG validations into data validations. Techniques for managing network devices using a graph model for high level configuration data are described in "Configuring And Managing Network Devices Using Program Overlay On Yang-Based Graph Database," U.S. patent application Ser. No. 15/462,465, filed on 17 Mar. 2017, the entire content of which is incorporated herein by reference.

Controller 110 may receive data from any of administrators 112, where the data represents create, update, and/or delete actions with respect to the unified intent data model. Controller 110 may be configured to use the same compilation logic for each of create, update, and delete as applied to the graph model.

In general, controller 110 may use a hierarchical data model for intents, low-level data models, and resources. The hierarchical data model can be based on YANG or YAML. The hierarchical data model can be represented as a graph, as discussed above. Modern systems have supported intents to ease the management of networks. Intents are typically declarative. To realize intents, controller 110 attempts to select optimal resources to realize the declared intents.

In accordance with one or more aspects of this disclosure, controller 110 performs failure impact analysis when one or more of the network elements 114 exhibits a failure (e.g., packet loss, or other failure). To perform such an analysis, controller 110 uses a model of resource interdependencies and event type interdependencies. Controller 110 may use or implement an inference engine, which may be an expert system and/or a finite state machine with a cycle consisting of three action states: match rules, select rules, and execute rules. Rules are applied on a set of facts active in memory. A fact model captures network event information.

In some examples, controller 110 and an associated inference engine (not shown in FIG. 1) recognizes two kinds of events: network events and logical events. Network events may be real, actual events generated from the network, and logical events may be those events generated from another rule as result of another network event. In some examples, network events are generated by a device on a network that is experiencing an operational condition or failure. In some examples, logical events are generated by controller 110.

An object definition for network and logical events may have the following form:

```
class Event {
    string id;
    string type;
    boolean isLogical;
    boolean isProcessed;
    string context;
}
```

An inference engine, as described herein, may operate using rules created with temporal constraints. Such temporal constraints or relations may be important in handling the network events, since they help correlate how events happen over time. Events may be relative to each other and might be difficult to describe using a specific timestamp. Temporal operators or attributes may include those indicating an event is "before" and "after" another event.

Controller 110 may, based on a network resource event dependency model, generate the rules applied by the inference engine. In some examples, controller 110 may generate a rule template using parameters based on the cause and effect dependencies defined in the network resource model. Controller 110 generates inference facts for the rule based on the cause-effect dependencies.

An object definition for an inference may include a cause and a list of effects, and may have the following form:

```
class Inference {
    string cause;
    list<string> effects;
}
```

To perform failure impact analysis, controller 110 may generate logical events which are dependent on the actual network events occurring in the network. Such a process may include identifying, using an inference rule, related resource instances which are dependent on the resource instance of an event, where that event may be an actual network event received by controller 110. Such a process may also include controller 110 identifying, for every dependent resource, related event types based on a resource event dependency model. Controller 110 may use this information to generate logical events.

Identifying related resources for an event may be performed using a network model. In some examples, information sufficient to identify such related resources may be stored in a resource store or in a cache. Such information may include a one-level dependency maintained for each resource, and may have a form such as:

<resource_type>:<resource_instance_id>.

For example in one network model, a resource dependency chain may have the form:

ge-0/0/1→lsp1→bng_svl_vpn
ge-0/0/1→lsp2→bng_ca_vpn

Where "ge-0/0/1" has a dependency of "lsp1," and "lsp1" has a dependency of "bng_svl_vpn." Also, "ge-0/0/1" has an additional dependency of "lsp2," and "lsp2" has a dependency of "bng_ca_vpn."

A resource store or cache may maintain such information as follows:

| Key | Value |
|---|---|
| INTERFACE:ge-0/0/1 | LSP:lsp1, LSP:lsp2 |
| LSP:lsp1 | VPN:bng_svl_vpn |
| LSP:lsp2 | VPN:bng_ca_vpn |

Identifying related event types may involve using a resource event dependency model and using dependencies within the inference engine that specify a list of dependent events for every "cause event." An object definition of such a dependency object may have the form:

```
class Dependency {
string cause;
string effect_resource_type;
list effects;
}
```

For example, if the dependency model has the mapping shown below, controller 110 creates dependency facts illustrated in the table below the mapping:
INTERFACE:OPER_DOWN→VRF:DOWN
INTERFACE:OPER_DOWN→LSP:STATUS_DOWN
LSP:STATUS_DOWN→VPN:STATUS_DOWN

| Cause | Effect Resource Type | Effects |
|---|---|---|
| INTERFACE: OPER_DOWN | VRF | VRF:DOWN |
| INTERFACE: OPER_DOWN | LSP | LSP: STATUS_DOWN, LSP: HIGH_LATENCY |
| LSP: STATUS_DOWN, | VPN | VPN: STATUS_DOWN |

Controller 110 uses information having the form illustrated in the table above (e.g., stored in a resource store or cache) to find the related events for a given dependent resource.

Once controller 110 has identified both related resources for an event, and has identified related event types for that event, controller 110 may generate logical events. Controller 110 may apply a forwarding chaining process that involves inferring unknown truths from known data and moving forward using determined conditions and rules to find a solution. In some examples, this may involve merging the effects and causes based on the generated inferences, persisting or storing an RCA tree (e.g., a graph of related events generated as part of the chaining process) in a database for further event analysis, and persisting or storing a list of logical events present in the RCA tree, thereby enabling another system to perform further analysis on the actual impact or effects on network 102.

Figure 2:
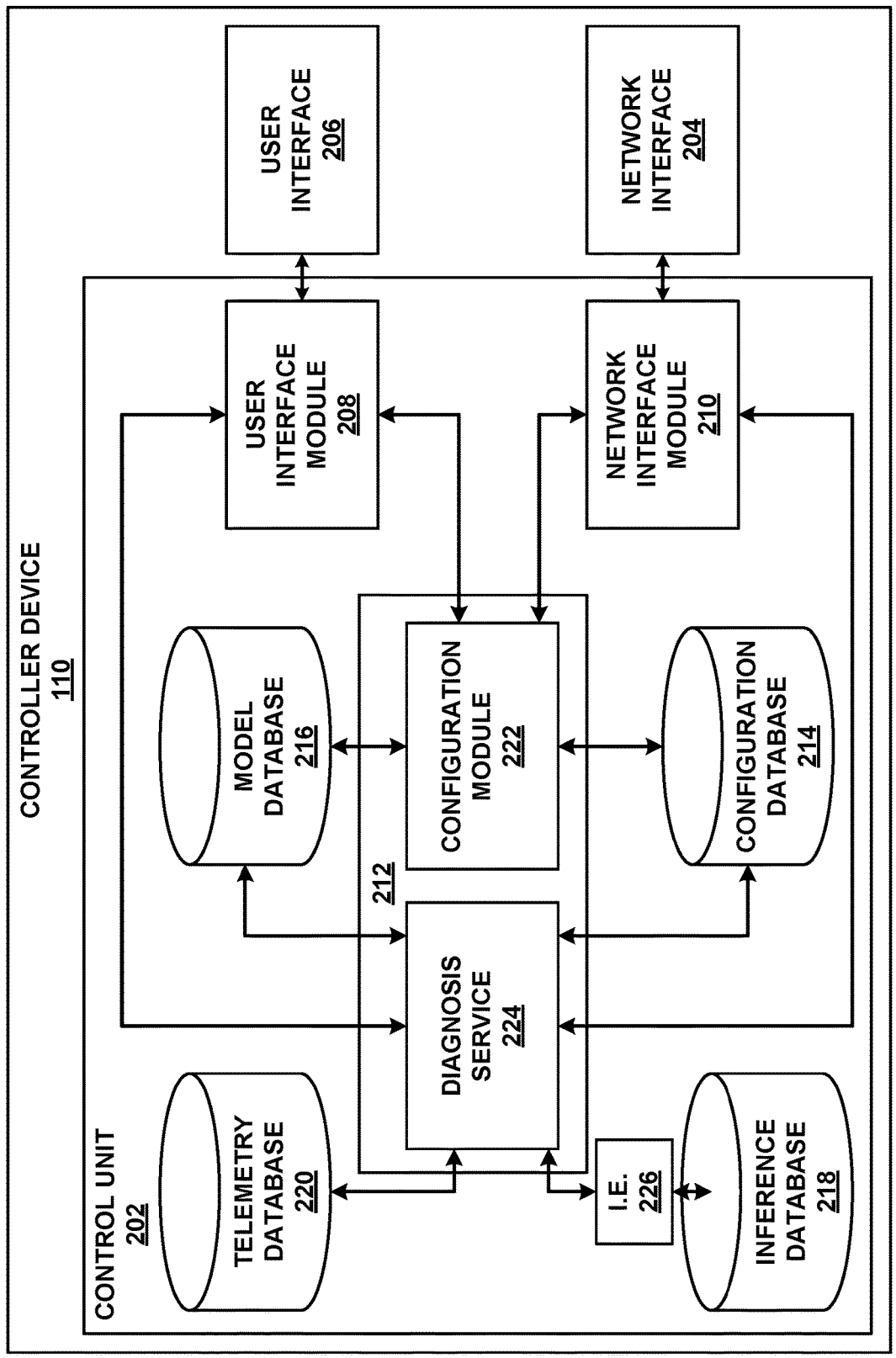
FIG. 2 is a block diagram illustrating an example controller that may be used for failure impact analysis, in accordance with one or more aspects of the present disclosure.

FIG. 2 is a block diagram illustrating an example controller or control system that may be used for failure impact analysis, in accordance with one or more aspects of the present disclosure. In FIG. 2, control system, controller device, or controller 110 of FIG. 2 may correspond to or be an example of controller 110 of FIG. 1. In the example illustrated in FIG. 2, controller 110 includes control unit 202, network interface 204, and user interface 206. The network interface 204 represents an example interface that can communicatively couple controller 110 to an external device, e.g., one of elements 114 of FIG. 1. The network interface 204 may represent a wireless and/or wired interface, e.g., an Ethernet® interface or a wireless radio configured to communicate according to a wireless standard, such as one or more of the IEEE 802.11 wireless networking protocols (such as 802.11 a/b/g/n or other such wireless protocols). Controller 110 may include multiple network interfaces in various examples, although only one network interface is illustrated in the non-limiting example of FIG. 2.

Control unit 202 represents any combination of hardware, hardware implementing software, and/or firmware for implementing the functionality attributed to the control unit 202 and its constituent modules and elements. When control unit 202 incorporates software or firmware, control unit 202 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), fixed function circuitry, programmable processing circuitry, or any other equivalent integrated or discrete logic circuitry, as well as any combinations of such components. A processing unit is generally implemented using fixed and/or programmable logic circuitry.

User interface 206 represents one or more interfaces by which a user, such as administrators 112 of FIG. 1, interacts with controller 110, e.g., to provide input and receive output. For example, the user interface 206 may represent one or more of a monitor, keyboard, mouse, touchscreen, touchpad, trackpad, speakers, camera, microphone, or the like. Furthermore, although in this example controller 110 includes a user interface 206, administrators 112 need not directly interact with controller 110, but instead may access controller 110 remotely, e.g., via the network interface 204.

Functionality of the control unit 202 may be implemented as one or more processing units in fixed or programmable digital logic circuitry. Such digital logic circuitry may include one or more microprocessors, digital signal processors (DSPs), application specific integrated circuits (ASICs), fixed function circuitry, programmable logic circuitry, field programmable gate arrays (FPGAs), or any other equivalent integrated or discrete logic circuitry, as well as any combination of such components. When implemented as programmable logic circuitry, the control unit 202 may further include one or more computer readable storage media storing hardware or firmware instructions to be executed by processing unit(s) of control unit 202.

In this example, control unit 202 includes a user interface module 208, network interface module 210, and management module 212. Control unit 202 executes user interface module 208 to receive input from and/or provide output via user interface 206. Control unit 202 also executes network interface module 210 to send and receive data (e.g., in packetized form) via network interface 204. The user interface module 208, the network interface module 210, and the management module 212 may again be implemented as respective hardware units, or in software or firmware implemented by appropriate hardware infrastructure, or a combination thereof.

The control unit 202 executes a management module 212 to manage various network devices, e.g., elements 114 of FIG. 1. Management includes, for example, configuring the network devices according to instructions received from a user (e.g., administrators 112 of FIG. 1) and providing the user with the ability to submit instructions to configure the network devices. The management module 212 accesses various databases, such as a configuration database 214, a model database 216, an inference database 218 and a telemetry database 220, that store data to assist in managing the various network devices. While the databases 214-220 are illustrated as separate databases, one or more of these databases 214-220 may be combined or otherwise rearranged. In this example, the management module 212 further includes a configuration module 222 and diagnosis service 224. In some examples, diagnosis service 224 may be programmable and/or configurable by a user and/or administrators 112. Further details relating to such a programmable diagnosis service are available in U.S. Provisional patent application Ser. No. 16/821,745, filed Mar. 17, 2020 entitled "Programmable Diagnosis Model For Correlation Of Network Events," the entire content of which is incorporated herein by reference.

The management module 212 is configured to receive intent unified-graph-modeled configuration data for a set of managed network devices from a user, such as administrators 112. Such intent unified-graph-modeled configuration data may be referred to as an "intent data model." Over time, the user may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent-to-child vertex relations can be represented with a "has" edge. For example, a vertex for Element A refers to a vertex for Element B using a has-edge can be understood to mean, "Element A has Element B."

The configuration database 214 generally includes information describing the managed network devices, e.g., elements 114. The configuration database 214 may include information indicating device identifiers (such as Media Access Control (MAC) and/or Internet Protocol (IP) addresses), device type, device vendor, devices species (e.g., router, switch, bridge, hub, etc.), or the like. The configuration database 214 also stores current configuration information (e.g., intent data model, or in some cases, both intent data model and low-level configuration information) for the managed devices (e.g., elements 114).

The model database 216 includes the models configured by a user, via the configuration module 222, that describe the structure of network 102. As described below, the model database 216 includes a network aware diagnosis model that is used by diagnosis service 224 to perform root cause analysis to find the malfunctioning element 114 that is a source of an event even when the malfunction is not the direct/immediate result of the event, but instead, a cascading downstream effect of the event.

Modules illustrated in FIG. 2 (e.g., user interface module 208, controller 110, configuration module 222, diagnosis service 224 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
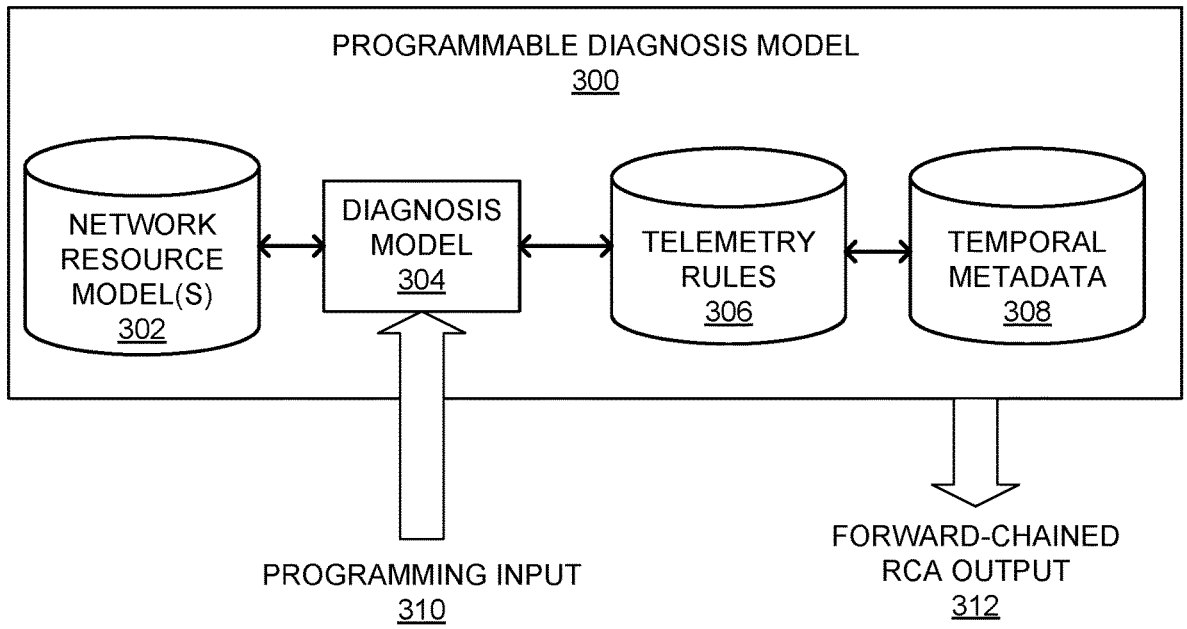
FIG. 3 is conceptual diagram illustrating components of an example programmable diagnosis model, in accordance with one or more aspects of the present disclosure.

FIG. 3 is a conceptual diagram illustrating components of an example programmable diagnosis model, in accordance with one or more aspects of the present disclosure. Programmable diagnosis model 300, which may be implemented by a controller, such as controller 110, models the network from multiple perspectives to be usable with networks with frequently changing topologies and support multiple concurrent faults at a time. Programmable diagnosis model 300 may be an example database corresponding to or included within model database 216 of FIG. 2. In the illustrated example, programmable diagnosis model 300 includes network resource model(s) 302, a diagnosis model 304, telemetry rules 306, and temporal metadata 308. The network resource model(s) 302 include service resource model(s) and device resource model(s), and define inter-resource dependencies. The telemetry rules 306 provide data that that enables controller 110 to monitor the state of one or more components in network 102. The telemetry rules 306 also enable controller 110 to generate or instigate alarms based on detecting thresholds configured in network 102. In some examples, the telemetry rules 306 may be included in a network resource model that also includes a network model (as described in U.S. patent application Ser. No. 16/731,372) for network 102 and device model information for device elements of elements 114.

Diagnosis model 304 captures the cause and effect (sometimes referred to herein as "correlations") relationship between various resources. For example, diagnosis model 304 may reflect cause-and-effect relationships across events that occur over network 102. The cause and effect relationships are defined between resources and resource alarms/events. When the cause and effect relationship is defined between resources, any critical alarm/event on a resource causes an effect on "supporting resources." When the cause and effect relationship is defined between resource alarms/events, an event on a resource causes an effect on a "supported resource" events.

Programmable diagnosis model 300 is used by diagnosis service 224 to perform forward-chained impact analysis and/or RCA in accordance with aspects of this disclosure. To aid in identifying the root cause of a fault or other event while accommodating dynamic changes in the topology of network 102, programmable diagnosis model 300 enables administrators to update aspects of diagnosis model 304 by providing programming input 310 via controller 110. Diagnosis service 224 uses programming input 310 to construct a resource definition graph that models network resources and interdependencies therebetween. Based on the model constructed in this way, diagnosis service 224 discovers the resources from network 102 and builds the relations across the discovered resources.

Individual vertices of the resource definition graph include one or more "playbooks" (see FIG. 4) that define respective telemetry rule(s) enabling diagnosis service 224 to fetch state information from network 102. The resource definition graph constructed by diagnosis service 224 captures both network model and device model information, as well as corresponding rules of the telemetry rules 306. The resource definition graph also includes diagnosis model 304, which provides cause and effect relationship information across events detected within network 102. A given vertex of the resource definition graph (including resource model information along with telemetry rule information) enables diagnosis service 224 to discover network and device resource instances of each object that exist on network 102, to collect the data required to fill and update the value of the object attributes, and to compute the actual value of the "state" attributes defined.

Programmable diagnosis model 300 also includes temporal metadata 308. Temporal metadata 308 includes information describing timing information of events detected among elements 114 of network 102. Temporal metadata 308 may include exact times, approximate times, or relative times measured with respect to discrete events detected within network 102. Based on criteria provided in programming input 310 or based on other criteria, diagnosis service 224 may apply the portions of temporal metadata 308 to potentially interrelated events to perform RCA with respect to a downstream event. In one example, the diagnosis service may retain or eliminate an event as a possible upstream cause based on whether or not the event occurred within a threshold time frame of causality with respect to the downstream event.

Using the combination of the network resource model(s) 302, diagnosis model 304 formed or updated with programming input 310, telemetry rules 306, and temporal metadata 308, diagnosis service 224 forms one or more of the inference rules stored to inference database 218. In turn, diagnosis service 224 applies those inference rules of inference database 218 that are applicable to the particular event under impact analysis or RCA to run programmable diagnosis model 300. The output produced by running programmable diagnosis model 300 is shown in FIG. 3 as forward-chained RCA output (or impact analysis output) 312.

More specifically, diagnosis service 224 uses the programmed model (a version of diagnosis model 304 formed using programming input 310) to automatically derive the relevant inference rules of inference database 218. In accordance with aspects of this disclosure, the inference rules stored to inference database 218 may be subject to one or more temporal constraints, which are described in greater detail below with respect to the application of temporal metadata. Diagnosis service 224 applies the derived inference rules to identify the impact analysis or source of the fault under RCA. When performing RCA, inference engine 226 maintains the event being analyzed in cache memory for a predetermined time interval, and generates an inference upon receiving a dependent event. Upon correlating the events, inference engine 226 may generate a smart event with an RCA tree and a root cause event to be output as part of forward-chained RCA output 312. In some examples, diagnosis service 224 saves the forward-chained RCA output 312 to an analytics database which may be implemented locally at controller 110, at a remote location, or in a distributed manner.

Figure 4:
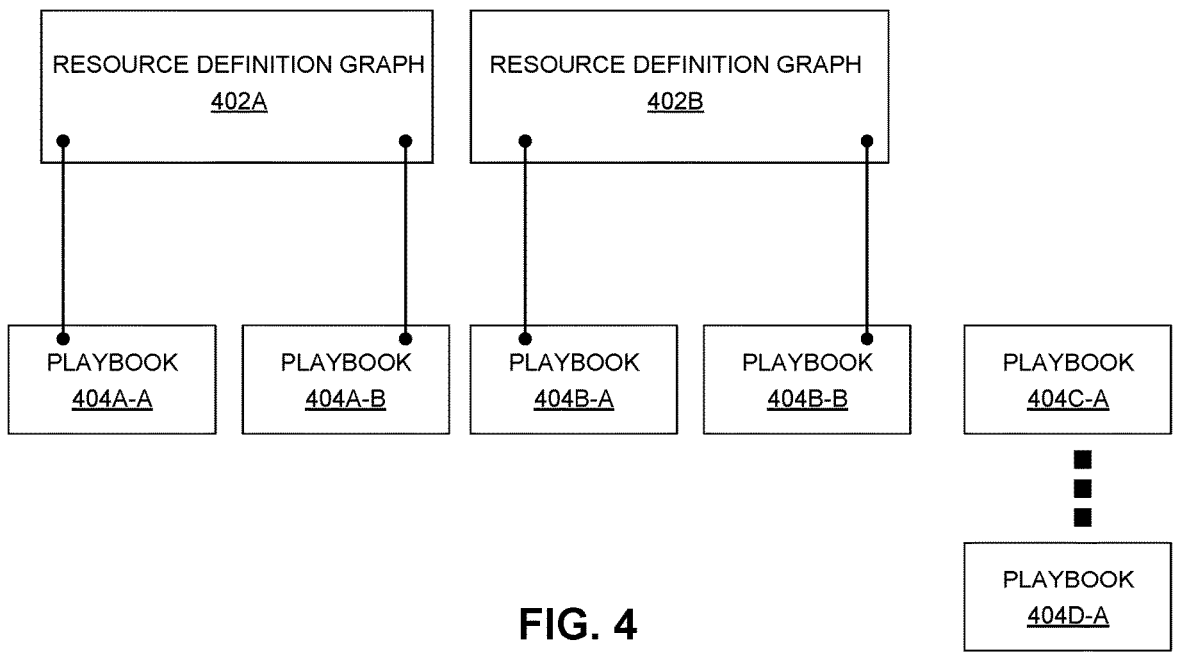
FIG. 4 is a conceptual diagram illustrating example resource definition graphs, in accordance with one or more aspects of the present disclosure.

FIG. 4 is a conceptual diagram illustrating example resource definition graphs, in accordance with one or more aspects of the present disclosure. In FIG. 4, each of resource definition graphs 402A and 402B (collectively, "resource definition graphs 402") models network resources and dependencies between the resources of the respective resource definition graph. Each of resource definition graphs 402 is a construct that is formed by modifying programmable diagnosis model 300 based on programming input 310. Each of resource definition graphs 402 specifies a set of resource models which contain one or more attributes, and/or one or more state(s), and/or one or more links to other resource models. Each of resource definition graphs 402 defines a set of relationships in a resource model that characterize a certain network context, which can be any of a network domain, can be a network device, a network service, etc.

In the example of FIG. 4, resource definition graph 402A is associated with playbooks 404A-A and 404A-B (collectively, "playbooks 404A"), and resource definition graph 402B is associated with playbooks 404B-A and 404B-B (collectively, "playbooks 404B"). Each of playbooks 404 defines those of telemetry rules 306 that enable diagnosis service 224 to fetch state information from network 102. Each of resource definition graphs 402 captures network model and device model information, as well as the corresponding rules of telemetry rules 306.

Figure 5:
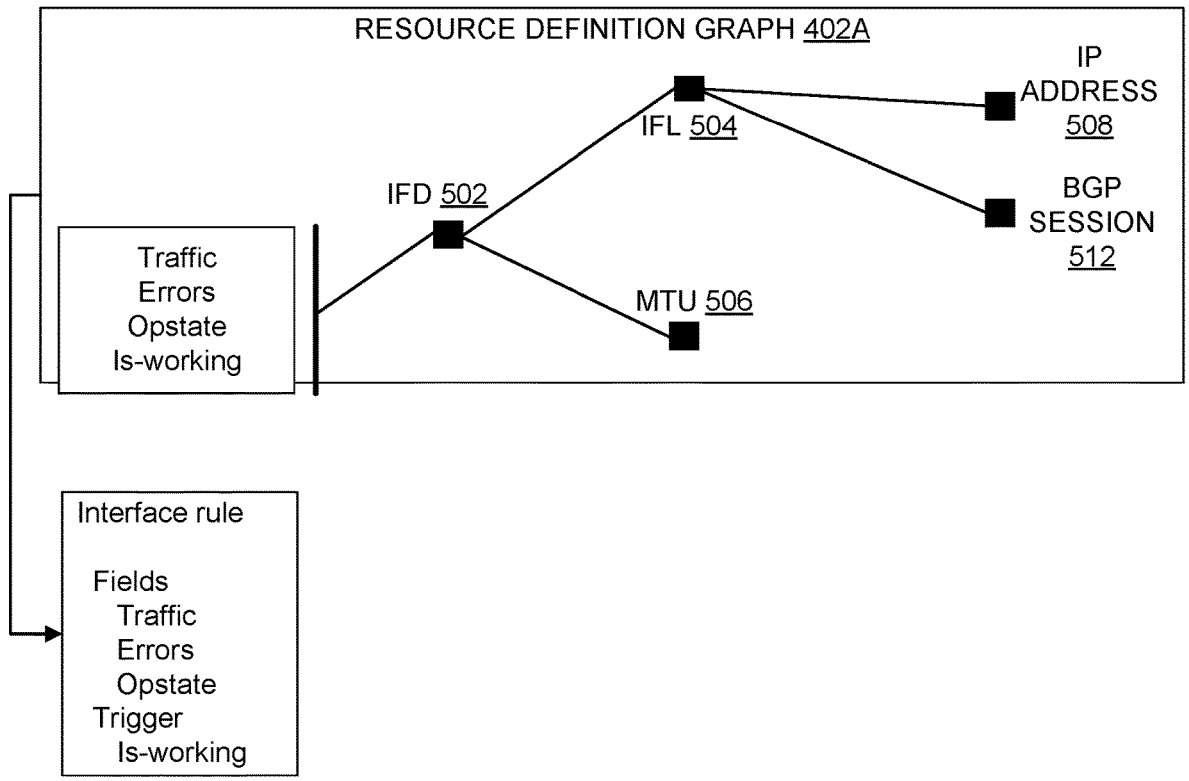
FIG. 5 is a conceptual diagram illustrating an example resource definition graph, in accordance with one or more aspects of the present disclosure.

FIG. 5 is a conceptual diagram illustrating an example resource definition graph, in accordance with one or more aspects of the present disclosure. FIG. 5 illustrates resource definition graph 402A of FIG. 4. In the example shown, resource definition graph 402A is a static graph, in that resource definition graph 402A includes definitions of object types (and not individual instances of the objects) of network 102. Resource definition graph 402A is also pluggable, in that it provides scalability and support for the programmability to integrate new service models. In the example of FIG. 5, resource definition graph 402A defines relationships between various object models, namely, a physical device (IFD 502), a logical device (IFL 504), and a maximum transmission unit size supported by the interface (MTU) 506, an internet protocol (IP) address 508, and a border gateway protocol (BGP) session 512. The inter-object links shown within resource definition graph 402A may include one or more unidirectional relationships and/or one or more bidirectional relationships.

Resource definition graph 402A captures network model information, device model information, and corresponding telemetry rules for the resources shown. Using the information available from resource definition graph 402A, controller 110 may discover the various instances of the objects described in resource definition graph 402A included in a particular device group of network 102. Based on the causality link between IFD 502 and IFL 504, controller 110 may determine that a fault occurring at IFD 502 potentially affects the functioning of IFL 504. Based on the causality link, diagnosis service 224 may include IFD 502 in the discovery process with respect to fault investigation for IFL 504. In this way, diagnosis service 224 may obtain object properties and service properties for the device group under discovery based on the causality links included in resource definition graph 402A.

In examples in which IFD 502 has multiple interfaces, diagnosis service 224 may run programmable diagnosis model 300 to derive an inference rule that associates the particular interface of IFD 502 with the dependent event (e.g., packet loss or other fault) occurring at IFL 504. Diagnosis service 224 further tunes the inference rule using one or more temporal constraints formed based on temporal metadata 308. If the fault discovered at IFL 504 fits the temporally compliant inference rule, diagnosis service 224 generates forward-chained RCA output to identify the fault at IFD 502 as either the root cause or as an intermediate cause (which leads to the root cause) of the fault discovered at IFL 504.

To obtain forward-chained RCA output 312, diagnosis service 224 may use diagnosis model 304 (formed or modified using programming input 310) to automatically derive the relevant inference rules of inference database 218. Again, diagnosis service 224 may derive the inference rules to comport with temporal constraints for causality as derived from temporal metadata 308. In turn, diagnosis service 224 uses the inference rules stored to inference database 218 to identify the source of the detected event (e.g. fault). Inference engine 226 may maintain an event in cache storage for a specified time interval and generate an inference when a potentially dependent (e.g., downstream effect) event arrives. Upon generating an event correlation, diagnosis service 224 may generate a "smart event" or "logical event" with an RCA tree and an identified root cause event. Diagnosis service 224 stores the smart event and the identified root cause event to an analytics database that may be implemented locally at controller 110, at a remote location, or in a distributed manner.

FIG. 6A through FIG. 6D are conceptual diagrams illustrating an example impact analysis performed using an instance or resource group dependencies graph in accordance with one or more aspects of the present disclosure. Each of FIG. 6A through FIG. 6D illustrate dependencies graph 700, which shows a resource group that has a number of layers of resources, including slots 701A, 701B, 701C, and 701D ("slots 701"), each of which may be one of many port concentrators or modular port concentrators associated with a network or network device. Also illustrated in each of FIG. 6A through FIG. 6D are PFE 702A through 702C ("PFEs 702"), Ethernet interface 703A through 703D ("interfaces 703"), label-switched path (LSP) 704A through 704C ("LSPs 704"), external Border Gateway Protocol (eBGP) service 705A through 705C ("eBGP services 705"), virtual routing and forwarding instance (VRF) 706A through 706C ("VRFs 706"), and customer edge devices or latencies 707A through 707C ("customer edge latencies 707"). Although a limited number of slots 701, PFEs 702, interfaces 703, LSPs 704, VRFs 706, customer edge latencies 707 are illustrated in FIG. 6A through FIG. 6D, techniques described herein may apply to other networks with any number of such resources, or resources of other types.

Dependencies graph 700 of FIG. 6A may correspond to a dependency model of a network, such as network 102 described in connection with FIG. 1. Dependencies graph 700 illustrates dependencies across each set of instances, or across each layer (e.g., across slots 701 to PFEs 702). Any instance shown in dependencies graph 700 (e.g., any of PFEs 702, interfaces 703, LSPs 704, eBGP services 705, VRFs 706, and/or customer edge latencies 707) may experience a failure, malfunction, glitch, or other event that may impact the operation of a network. For instance, slot 701A and each of PFEs 702 have a dependency relationship, where an event affecting slot 701A may affect each of PFEs 702. Similarly, an event affecting PFE 702B may affect some or all of interfaces 703. The dependencies illustrated by dependencies graph 700 may be used (e.g., by controller 110) to identify the impact or effects of an event that occurs with respect to any of the instances illustrated in FIG. 6A through FIG. 6D.

FIG. 6A through FIG. 6D are described herein with reference to FIG. 1 and FIG. 2, and in particular, with reference to controller 110 of FIG. 2 performing operations to carry out an impact analysis or failure impact analysis for network 102 of FIG. 1. To perform such an analysis, controller 110 may receive information about an event occurring within network 102, and may determine or predict the effect of such an event on other devices, services, instances, or other elements of network 102. In some examples, controller 110 may, based on such determined or predicted effects, identify actions or corrective actions that may be taken to reduce or eliminate any negative effects that may result from the original event. Controller 110 may take action, or cause another system to take action, to address such effects. Accordingly, if controller 110 is able to accurately determine or predict the effects of an event before some or all of the effects of an event actually occur, controller 110 may be able to circumvent problems with network 102. Therefore, effective use of failure impact analysis may generally improve the operation of network 102, at least by maintaining effective and efficient operation of network 102 more consistently.

Figure 6A:
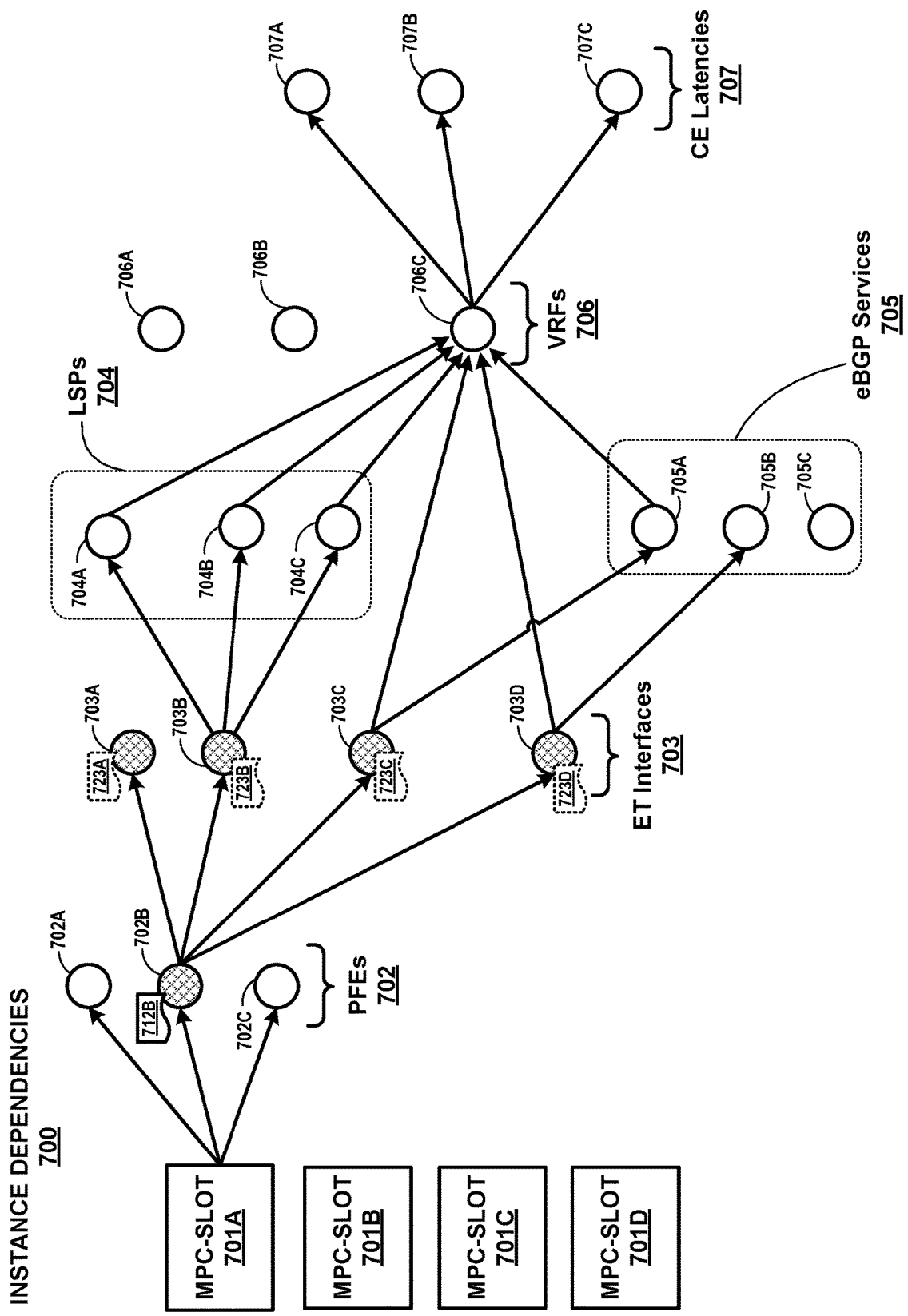
FIG. 6A through FIG. 6D are conceptual diagrams illustrating an example impact analysis performed using an instance dependencies graph in accordance with one or more aspects of the present disclosure.

In FIG. 6A, and in accordance with one or more aspects of the present disclosure, controller 110 may initiate an impact analysis for an event occurring within a resource group of network 102. For instance, in an example that can be described with reference to FIG. 1, FIG. 2, and FIG. 6A, a network device, such as PFE 702B, experiences an operational event or failure. PFE 702B generates PFE network event 712B representing the operational event or failure experienced by PFE 702B (see element labeled "712B" adjacent to PFE 702B in FIG. 6A). PFE 702B communicates PFE network event 712B to controller 110. Network interface 204 of controller 110 detects PFE network event 712B and communicates information about PFE network event 712B through controller 110 and to management module 212. Diagnosis service 224 of management module 212 determines that the information PFE network event 712B indicates that PFE 702B has experienced a failure. Diagnosis service 224 initiates an impact analysis for PFE network event 712B to determine what the effect on the failure of PFE 702B might be on network 102.

Controller 110 may fetch resource instances that are dependent upon PFE 702B. For instance, continuing with the example being described with reference to FIG. 1, FIG.

2, and FIG. 6A, diagnosis service 224 accesses model database 216 to fetch information about resources related to PFE 702B. Diagnosis service 224 receives, from model database 216, information about dependent resources of PFE 702B based on a network model, such as dependencies graph 700 of FIG. 6A. In some examples, some or all of model database 216 may be implemented as a cache (e.g., similar to temporal metadata 308) to enable dependent resource information to be retrieved quickly. In such an example, diagnosis service 224 may fetch such resource dependency information by making a function call, which may have the form:

---
Function String fetchDependentResourceIds(String resourceId)  {.   Return cache.get(resource).   }
---

Dependent resource information may be maintained using a one-level dependency model, where each instance (e.g., PFE 702B) is represented as a key with one or more values that represent dependent resources. In the example of FIG. 6A, each of interfaces 703A, 703B, 703C, and 703D have a dependency relationship with PFE 702B. Accordingly, diagnosis service 224 determines, based on the information received from model database 216 (or a cache), that each of interfaces 703 are related to or dependent upon PFE 702B.

Controller 110 may fetch related event types based on a resource event dependency model. For instance, still referring to the example being described with reference to FIG. 1, FIG. 2, and FIG. 6A, diagnosis service 224 of controller 110 accesses a resource event dependency model included within model database 216 to fetch information about dependent events associated with a given cause event. Such a model may include a dependency object that has fields that include a cause, an effect resource type, and a list of effects. For any given cause, such a model identifies an affected resource type and a list of effects on that resource type. Therefore, if diagnosis service 224 provides an input (e.g., PFE network event 712B) to model database 216, where that input specifies a cause (e.g., PFE 702B has failed), model database 216 may respond by identifying a list of "effect resource types," and for each effect resource type, model database 216 may further provide information about the list of effects that are expected or predicted to result from that PFE network event 712B.

Controller 110 may generate logical events (interface logical events 723A, 723B, 723C, and 723D) that are triggered by PFE network event 712B. For instance, referring again to the example being described with reference to FIG. 1, FIG. 2, and FIG. 6A, diagnosis service 224 of controller 110 generates one or more inferred events that are used to identify a network or actual event that is expected to occur as a result of a particular cause. In some examples, diagnosis service 224 may generate such a logical event for each effect resource type received from model database 216. FIG. 6A illustrates such interface logical events 723A, 723B, 723C, and 723D using a dotted line notation for events 723A, 723B, 723C, and 723D, indicating that such events are not actual events generated by respective interfaces 703, but rather, are inferred, predicted, or logical events generated by diagnosis service 224 of controller 110.

Each logical event generated by diagnosis service 224 may include an identifier field, an event type flag, an "is logical" flag, an "is processed" flag, and a context identifier. For each logical event, diagnosis service 224 uses the effect resource instance identifier and the effect event type to generate the identifier field for each logical event. For each logical event, diagnosis service 224 uses the effect event type to generate the event type field. For each logical event, diagnosis service 224 sets the "is logical" flag to true to indicate that the event is a logical event (as opposed to a network event). For each logical event, diagnosis service 224 sets the "is processed" flag to true to indicate that the event has been processed. For each logical event, diagnosis service 224 initializes the context field using the cause network event identifier.

In some examples, diagnosis service 224 outputs interface logical events 723A, 723B, 723C, and 723D to user interface module 208 to inform one or more administrators 112 about potential impacts of the failure at PFE 702B. Diagnosis service 224 may also output information about interface logical events 723A, 723B, 723C, and 723D to another system to enable corrective action(s) to be taken to eliminate or mitigate potentially negative impacts on network 102.

In some examples, diagnosis 224 generates each logical event if the event does not already exist. For example, in some cases, a corresponding event might already exist if an actual network event occurred before diagnosis service 224 could generate the logical event. In other examples, a corresponding event might already exist if a logical event had been previously generated as a result of processing another event. If the event already exists, diagnosis service 224 generates a logical event with the "is logical" flag set to false and the inference gets triggered. One way to handle a logical event generated after receiving a corresponding ("equivalent") network event is to merge the logical event with the network event, as further described herein.

The following pseudocode illustrates a rule that can be used for generating logical events:

---
query checkEventExists(string eventId)
    $existing_event  :   Event( id == eventId )
end
rule 'Logical event generation rule'
when
    $network_event = Event(isProcessed==false)
    $cause_event_type =
        $network_event.getId( ) .split(":") [1]
    $network_event.setisProcessed(true)
    $dependent_resource_ids =
        fetchDependentResourceIds(network_event.getId( ))
    dependent_resource_id : string( ) from
        $dependent_ resource_ids
    $effect_resource_type =
        dependent_resource_id.split(":") [0]
    $effect_event: Dependency(cause==$cause_event_type
        and effect_resource_type ==
    $effect_resource_type) .getEffects( )
    checkEventExists(dependent_resource_id+$effect_event)
then
    if $existing_event != null:
    Event $logical_event = Event( );
    $logical_event.setId(dependent_resource_id+$effect_event)
    $logical_event.setType($effect_resource_type)
    $logical_event.setisProcessed(false)
    $logical_event.setisLogical(true)
    $logical_event.setContext($network_event.getContext( ))
end
---

Figure 6B:
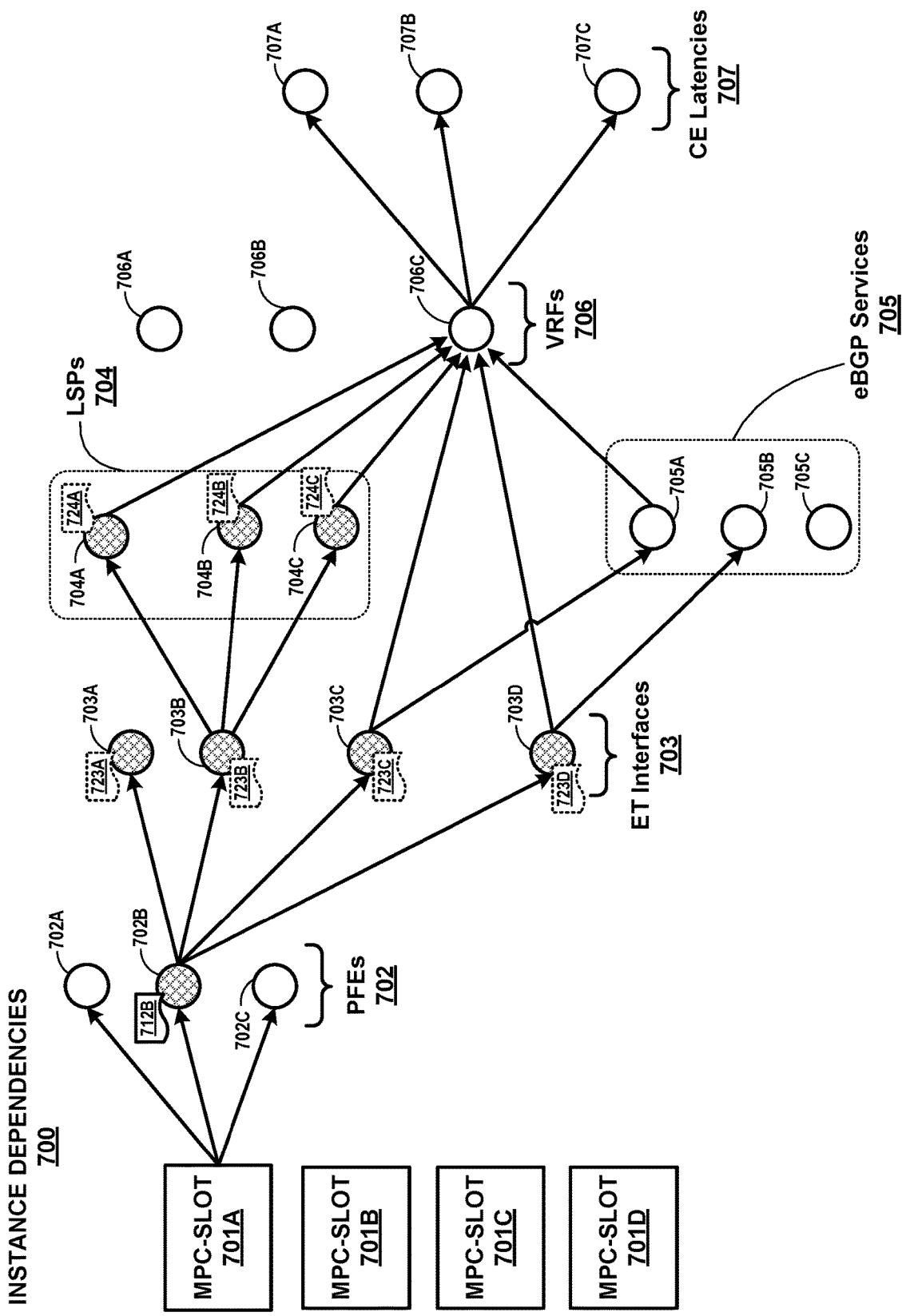

FIG. 6B illustrates that generating each of interface logical events 723B, 723C, and 723D may cause further logical events to be generated. For instance, continuing with the example being described but now with reference to FIG. 6B, diagnosis service 224 generates interface logical event 723B as described above. Diagnosis service 224 of controller 110 analyzes interface logical event 723B and determines that interface logical event 723B is associated with interface 703B. Diagnosis service 224 accesses model database 216 to retrieve information about resources related to interface 703B. Diagnosis service 224 receives, from model database 216, information identifying LSPs 704A, 704B, and 704C as being related to or dependent upon interface 703B, as illustrated in FIG. 6B. At the same time, concurrently, or at a different time, diagnosis service 224 also accesses a resource event dependency model included within model database 216 to fetch information about dependent events associated with interface logical event 723B. Diagnosis service 224 determines, based on the dependent event information, that interface logical event 723B has an effect resource type and effects associated with each of LSPs 704A, 704B, and 704C. Diagnosis service 224 generates, based on a forward chaining analysis and the information from model database 216, new LSP logical events 724A, 724B, and 724C, indicating that interface logical event 723B is a cause having effects represented by LSP logical events 724A, 724B, and 724C.

Figure 6C:
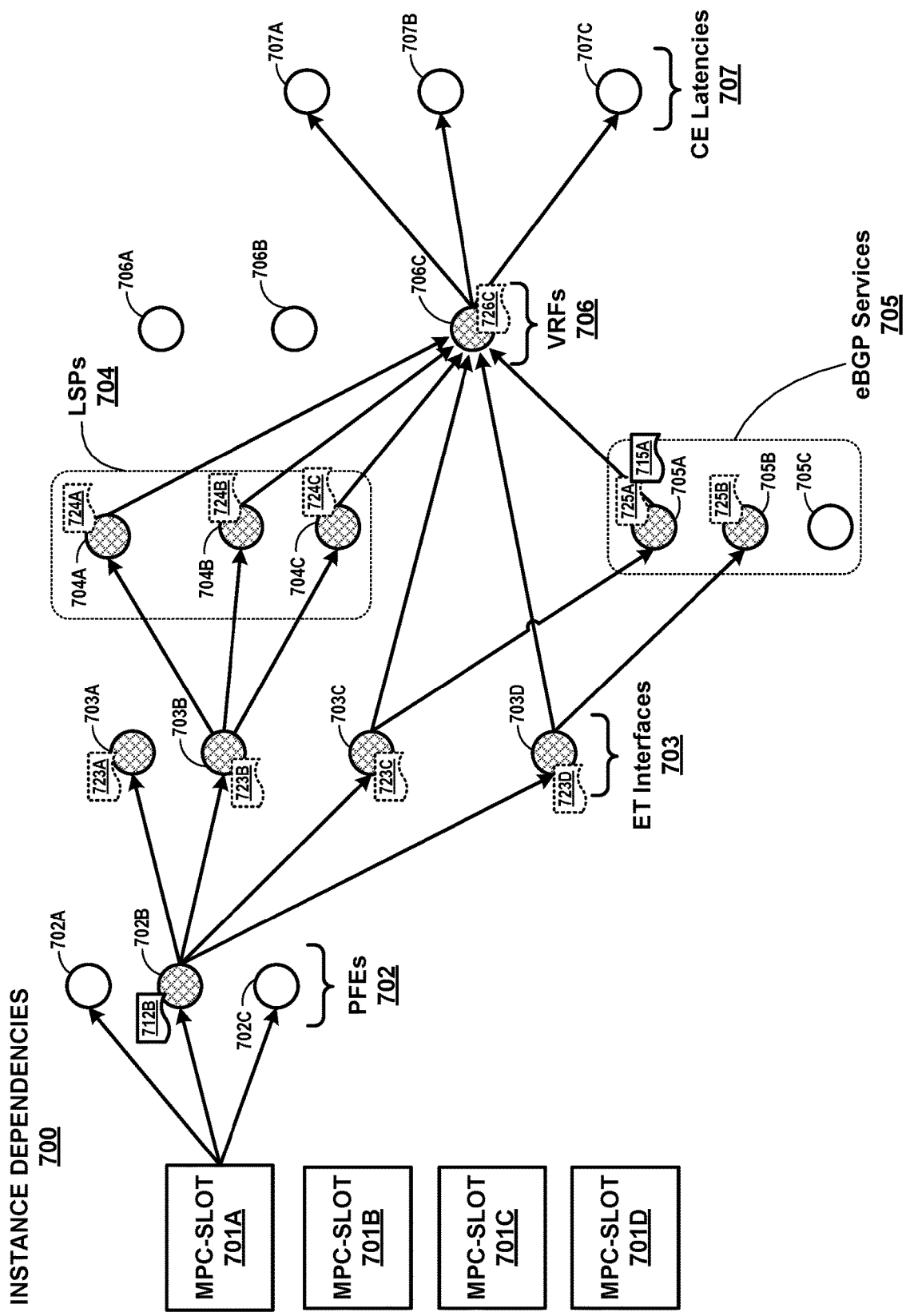

FIG. 6C illustrates that interface logical event 723C generates interface logical events associated with VRF 706C and eBGP service 705A, and also that interface logical event 723D generates interface logical events associated with nVRF 706C and eBGP service 705B. For instance, again with reference to the example being described and now with reference to FIG. 2 and FIG. 6C, diagnosis service 224 analyzes interface logical event 723C and determines that interface logical event 723C is associated with interface 703C. Diagnosis service 224 accesses model database 216 for information about resources related to interface 703C and also for information about event dependencies associated with interface logical event 723C. Diagnosis service 224 generates, based on the forward chaining analysis and the information from model database 216, new VRF logical event 726C and new eBGP logical event 725A.

Similarly, diagnosis service 224 analyzes interface logical event 723D and determines that interface logical event 723D is associated with interface 703D. Diagnosis service 224 accesses model database 216 for information about resources related to interface 703D and also for information about event dependencies associated with interface logical event 723D. Diagnosis service 224 generates, based on the forward chaining analysis and the model information from model database 216, new VRF logical event 726C and new eBGP logical event 725A. In some examples, diagnosis service 224 may determine that VRF logical event 726C has already been generated as a result of processing interface logical event 723C. In such an example, diagnosis service 224 might not generate an additional VRF logical event 726C, or if generated, the later-generated VRF logical event 726C may be merged with the corresponding VRF logical event 726C generated as a result of interface logical event 723C. Handling potentially duplicate logical events in such a manner may prevent duplicative processing by controller 110 or diagnosis service 224.

Figure 6D:
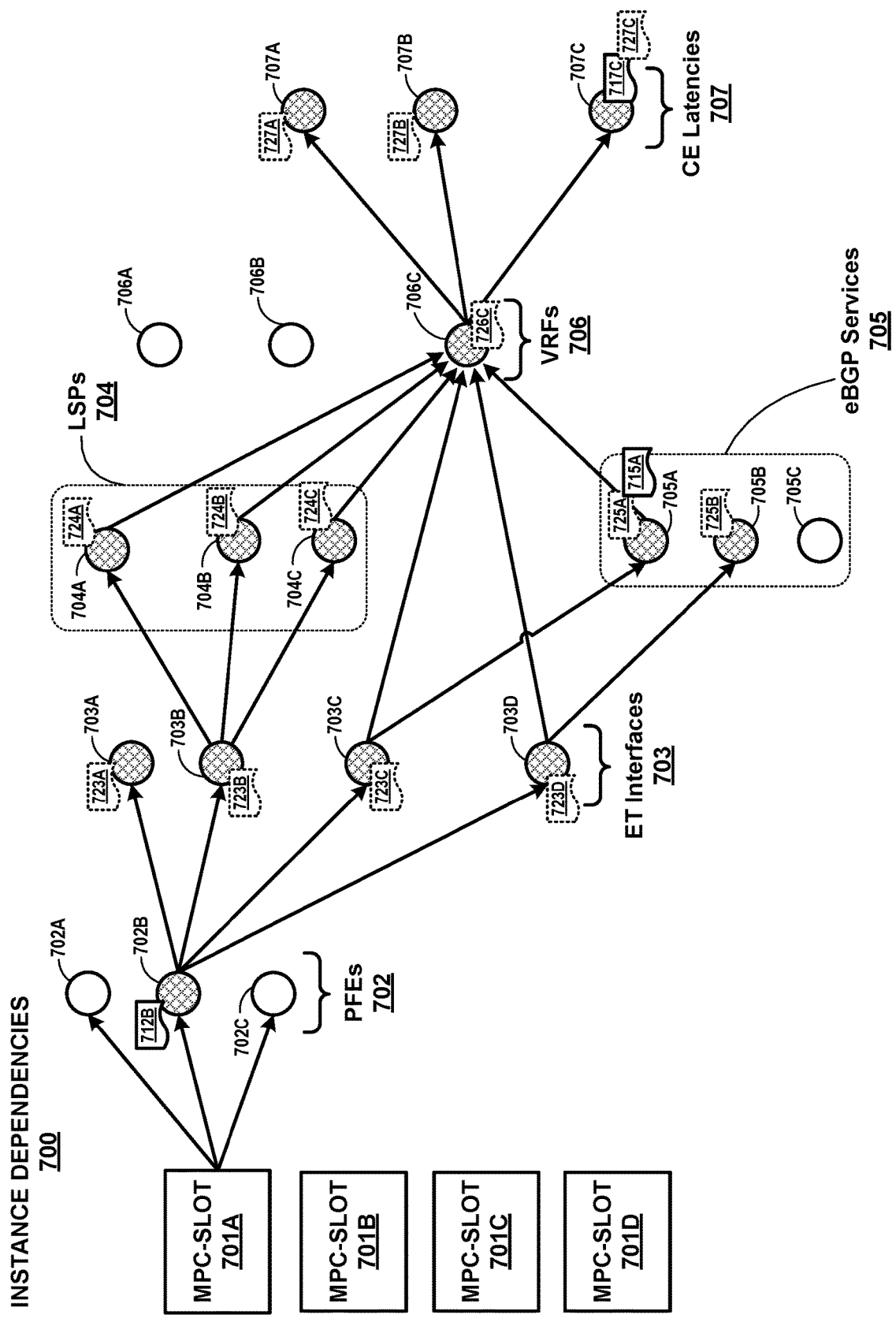

FIG. 6D illustrates that VRF logical event 726C causes CE logical events 727A, 727B, and 727C. For instance, continuing with the example being described and now with reference to FIG. 2 and FIG. 6D, diagnosis service 224 analyzes VRF logical event 726C and determines that VRF logical event 726C is associated with VRF 706C. Diagnosis service 224 accesses model database 216 to fetch information about resources related to VRF 706C and event dependencies associated with VRF logical event 726C. Diagnosis service 224 generates, based on the information from model database 216, CE logical events 727A, 727B, and 727C.

In general, events associated with a network tend to be near-instantaneous and immutable. However, in at least some examples described herein, such events might not be near-instantaneous, and might not be immutable. In some cases, particularly for network events generated after a corresponding logical event has been processed, events might be modified or merged with another event (e.g., the later network event might be merged with the corresponding earlier logical event). Similarly, for logical events that are generated after a corresponding actual network event (or after a corresponding logical event caused by another logical event), such later-generated events might be modified or merged with another (e.g., earlier) event. Modifying such an event may help ensure that little or no inefficient, duplicative, or otherwise unnecessary processing is performed as a result of redundant events being generated when performing a root cause analysis or a failure impact analysis.

FIG. 6D illustrates an example of how one or more network events may be generated after a corresponding earlier logical event is generated. For instance, in the example being described and with reference to FIG. 6D, eBGP service 705A may experience an operational event or failure after eBGP logical event 725A has been generated by diagnosis service 224. The operational event or failure experienced by eBGP service 705A may therefore be an actual effect of the original failure of PFE 702B. In such an example, eBGP service 705A generates eBGP network event 715A, representing the actual operational event or failure experienced by eBGP service 705A. EBGP service 705A communicates eBGP network event 715A to controller 110. Network interface 204 of controller 110 detects eBGP network event 715A and communicates information about eBGP network event 715A through controller 110 and to management module 212. Diagnosis service 224 of management module 212 determines that the information eBGP network event 715A indicates that eBGP service 705A has experienced a failure. Diagnosis service 224 may initiate an impact analysis for eBGP network event 715A. Diagnosis service 224 may determine that eBGP network event 715A is an effect of the failure PFE 702B. Diagnosis service 224 may further determine that this event has already been addressed through previously-generated eBGP logical event 725A. In the example being described, since the actual failure (represented by eBGP network event 715A) occurs after controller 110 had processed eBGP logical event 725A, controller 110 may have already addressed, or caused to be addressed, the effects of the failure of PFE 702B. Accordingly, diagnosis service 224 may merge eBGP network event 715A into eBGP logical event 725A, thereby avoiding additional duplicative processing to address the effects of PFE network event 712B and eBGP network event 715A.

FIG. 6D also illustrates that one or more logical events may be generated after corresponding actual network events are generated. For instance, again with reference to FIG. 6D, customer edge device 707C may experience an operational event or failure. In the example being described, the operational event or failure occurs very early, due to network traffic or other circumstances, and even occurs prior to when diagnosis service 224 generates CE logical event 727C. In such an example, customer edge device 707C would cause CE network event 717C to be generated and communicated to controller 110 prior to when diagnosis service 224 generates CE logical event 727C. When diagnosis service 224 of controller 110 later processes VRF logical event 726C and generates CE logical event 727C, as described above, diagnosis service 224 would determine that it had already processed CE network event 717C. In some examples, diagnosis service 224 would then merge CE logical event 727C into previously-processed CE network event 717C, thereby avoiding additional duplicative processing to address the effects of CE logical event 727C.

Figure 7:
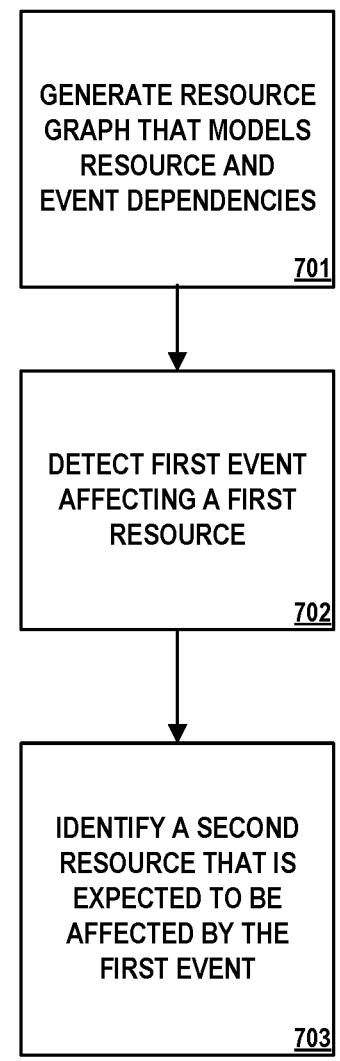
FIG. 7 is a flow diagram illustrating operations performed by an example controller in accordance with one or more aspects of the present disclosure.

FIG. 7 is a flow diagram illustrating operations performed by an example controller in accordance with one or more aspects of the present disclosure. FIG. 7 is described below within the context of controller 110 of FIG. 1 and FIG. 2. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described.

In the process illustrated in FIG. 7, and in accordance with one or more aspects of the present disclosure, controller 110 may generate a resource graph that models resource and event dependencies (701). For example, with reference to FIG. 1 and FIG. 2, user interface 206 of controller 110 detects input and outputs information about the input to user interface module 208. User interface module 208 outputs the information to management module 212. Configuration module 222 of management module 212 determines that the input corresponds to configuration information, perhaps entered by an administrator, relating to network, such as network 102 of FIG. 1. In some examples, the configuration information may be received in the form of programming information or programming code describing attributes of network 102. Configuration module 222 may generate one or more models based on the configuration information. Such models may detail resource dependencies within network 102 and/or detail event dependencies within network 102. Configuration module 222 stores the models in model database 216.

Controller 110 may detect a first event affecting a first resource of the plurality of resources (702). For example, network interface 204 of controller 110 detects input and outputs information about the input to controller 110. Controller 110 outputs information about the input to diagnosis service 224. Diagnosis service 224 determines that the input corresponds to an indication and/or notification that one or more resources within network 102 has experienced or is experiencing an operational event. Diagnosis service 224 further determines that the input indicates that one or more aspects of element 114B of network 102 has failed.

Controller 110 may identify a second resource that is expected to be affected by the first event (703). For example, diagnosis service 224 queries model database 216 for information about resource dependencies and event dependencies associated with element 114B. Diagnosis service 224 determines, based on information from model database 216, that element 114A and element 114C have a resource dependency with element 114B. Diagnosis service 224 further determines that element 114A has an event dependency with element 114B, but that element 114C does not have an event dependency with element 114B. Diagnosis service 224 generates one or more logical events for element 114A. Diagnosis service 224 uses the logical events to determine that element 114A is expected to be affected by the failure of element 114B.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, or wireless technologies such as infrared, radio, and microwave, then the coaxial cable, fiber optic cable, twisted pair, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above could also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system comprising processing circuitry and a storage device, wherein the processing circuitry has access to the storage device and is configured to:
   detect a first network event affecting a first resource of a plurality of resources on a network;
   generate, based on dependencies among the plurality of resources, a logical event associated with a second resource, wherein the second resource is expected to be affected by the first network event;
   detect, after generating the logical event associated with the second resource, a second network event affecting the second resource;
   refrain from processing the second network event, wherein to refrain from processing the second network event, the processing circuitry is further configured to merge the second network event into the logical event associated with the second resource; and
   prior to detecting the second network event, process the logical event associated with the second resource.

2. The system of claim 1, wherein to refrain from processing the second network event, the processing circuitry is configured to:
   avoid duplicative processing associated with processing the second network event.

3. The system of claim 1, wherein to generate the logical event associated with the second resource, the processing circuitry is further configured to:
   generate a resource graph that models dependencies between the plurality of resources on the network.

4. The system of claim 3, wherein to generate the resource graph, the processing circuitry is further configured to:
   generate the resource graph based on event dependencies among the plurality of resources.

5. The system of claim 4, wherein to generate the resource graph, the processing circuitry is further configured to:
   generate the resource graph further based on resource dependencies among the plurality of resources.

6. The system of claim 3, wherein to generate the logical event associated with the second resource, the processing circuitry is further configured to:
   apply the resource graph to generate a plurality of inference rules with respect to the plurality of resources modeled by the resource graph.

7. The system of claim 3, wherein to generate the resource graph, the processing circuitry is further configured to:
   receive programming input; and
   generate the resource graph based on the programming input.

8. The system of claim 3, wherein to generate the resource graph, the processing circuitry is further configured to:
   apply temporal constraints to each of the dependencies modeled by the resource graph.

9. The system of claim 1, wherein to generate the logical event associated with the second resource, the processing circuitry is further configured to:
   determine that the second resource has both resource and event dependencies on the first resource.

10. The system of claim 1, wherein to generate the logical event associated with the second resource, the processing circuitry is further configured to:
   perform a forward chaining analysis to identify the second resource.

11. A system comprising processing circuitry and a storage device, wherein the processing circuitry has access to the storage device and is configured to:
   detect a first network event affecting a first resource of a plurality of resources on a network;
   generate, based on dependencies among the plurality of resources, a logical event associated with a second resource, wherein the second resource is expected to be affected by the first network event;
   detect, after generating the logical event associated with the second resource, a second network event affecting the second resource;
   refrain from processing the second network event;
   generate, based on dependencies among the plurality of resources, a logical event associated with a third resource, wherein the third resource is expected to be affected by the first network event;
   detect, before generating the logical event associated with the third resource, a third network event affecting the third resource; and
   refrain from processing the logical event associated with the third resource.

12. The system of claim 11, wherein to refrain from processing the logical event associated with the third resource, the processing circuitry is further configured to:
   merge the logical event associated with the third resource into the third network event.

13. The system of claim 12, wherein the processing circuitry is further configured to:
   prior to generating the logical event associated with the third resource, process the third network event.

14. The system of claim 12, wherein to refrain from processing the logical event associated with the third resource, the processing circuitry is configured to:
   avoid duplicative processing associated with processing the logical event associated with the third resource.

15. A method comprising:
   detecting, by a control system, a first network event affecting a first resource of a plurality of resources on a network;
   generating, by the control system and based on dependencies among the plurality of resources, a logical event associated with a second resource, wherein the second resource is expected to be affected by the first network event;
   detecting, by the control system and after generating the logical event associated with the second resource, a second network event affecting the second resource;
   refraining, by the control system, from processing the second network event, wherein refraining from processing the second network event includes merging the second network event into the logical event associated with the second resource; and
   prior to detecting the second network event, processing the logical event associated with the second resource.

16. The method of claim 15, further comprising:
   generating, by the control system and based on dependencies among the plurality of resources, a logical event associated with a third resource, wherein the third resource is expected to be affected by the first network event;
   detecting, by the control system and before generating the logical event associated with the third resource, a third network event affecting the third resource; and
   refraining, by the control system, from processing the logical event associated with the third resource.

17. The method of claim 16, wherein refraining from processing the logical event associated with the third resource includes:
   merging the logical event associated with the third resource into the third network event.

18. A non-transitory computer-readable storage medium comprising instructions that, when executed, configure processing circuitry of a computing system to:
   detect a first network event affecting a first resource of a plurality of resources on a network;
   generate, based on dependencies among the plurality of resources, a logical event associated with a second resource, wherein the second resource is expected to be affected by the first network event;
   detect, after generating the logical event associated with the second resource, a second network event affecting the second resource;
   refrain from processing merge the second network event;
   merge the second network event into the logical event associated with the second resource; and
   prior to detecting the second network event, process the logical event associated with the second resource.

* * * * *

UNITED STATES PATENT AND TRADEMARK OFFICE
CERTIFICATE OF CORRECTION

PATENT NO. : 11,809,266 B2
APPLICATION NO. : 17/652096
DATED : November 7, 2023
INVENTOR(S) : Jayanthi R, Javier Antich and Chandrasekhar A It is certified that error appears in the above-identified patent and that said Letters Patent is hereby corrected as shown below:

In the Claims

Column 26, Line 46 (Claim 18): Replace "refrain from processing merge the second network event;" with -- refrain from processing the second network event; --

Signed and Sealed this
Eighteenth Day of February, 2025

Coke Morgan Stewart
*Acting Director of the United States Patent and Trademark Office*